United States Patent
Kimura et al.

(10) Patent No.: US 10,032,417 B2
(45) Date of Patent: Jul. 24, 2018

(54) LIGHT SOURCE DEVICE AND DISPLAY DEVICE

(71) Applicant: Japan Display Inc., Tokyo (JP)

(72) Inventors: Susumu Kimura, Tokyo (JP); Kazuhiko Sako, Tokyo (JP); Tadafumi Ozaki, Tokyo (JP); Naoyuki Takasaki, Tokyo (JP); Fumitaka Gotoh, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 74 days.

(21) Appl. No.: 15/367,091

(22) Filed: Dec. 1, 2016

(65) Prior Publication Data

US 2017/0162128 A1    Jun. 8, 2017

(30) Foreign Application Priority Data

Dec. 7, 2015    (JP) ................... 2015-238453

(51) Int. Cl.
| | |
|---|---|
| *G06F 3/038* | (2013.01) |
| *G09G 3/34* | (2006.01) |
| *F21V 8/00* | (2006.01) |
| *H05B 33/08* | (2006.01) |

(52) U.S. Cl.
CPC .......... *G09G 3/342* (2013.01); *G02B 6/0068* (2013.01); *H05B 33/083* (2013.01); *H05B 33/089* (2013.01); *H05B 33/0827* (2013.01); *G09G 2320/0646* (2013.01); *G09G 2330/12* (2013.01)

(58) Field of Classification Search
CPC . G02F 1/133; G09G 3/20; G09G 3/34; G09G 3/36; G09G 3/342; G09G 2320/0626; G09G 2320/0646; G09G 2330/12; G09G 2360/16; H04N 5/66; G02B 6/0068; H05B 33/0827; H05B 33/083; H05B 33/089
See application file for complete search history.

(56) References Cited

U.S. PATENT DOCUMENTS

| | | | | |
|---|---|---|---|---|
| 2013/0313973 | A1* | 11/2013 | DeNicholas | ......... H05B 33/089 315/122 |
| 2014/0070713 | A1* | 3/2014 | Kado | .................... H02M 3/158 315/186 |

FOREIGN PATENT DOCUMENTS

| | | |
|---|---|---|
| JP | 2012-156064 A | 8/2012 |
| JP | 2013-029691 A | 7/2013 |
| JP | 2013-222515 A | 10/2013 |

* cited by examiner

*Primary Examiner* — Nelson Rosario
(74) *Attorney, Agent, or Firm* — Michael Best & Friedrich LLP

(57) ABSTRACT

According to one embodiment, a light source device includes a plurality of light emitting elements including at least first and second light emitting elements, lightguide, first circuit, second circuit, and controller. The lightguide includes a first surface on which light from light emitting elements is incident and a second surface through which the light exits. The first circuit connects light emitting elements in series. The second circuit can bypass each of light emitting elements. The controller turns on light emitting elements using the first circuit if light emitting elements function normally, and if one of light emitting elements functions abnormally, the controller turns on the light emitting element functioning normally using the second circuit.

19 Claims, 12 Drawing Sheets

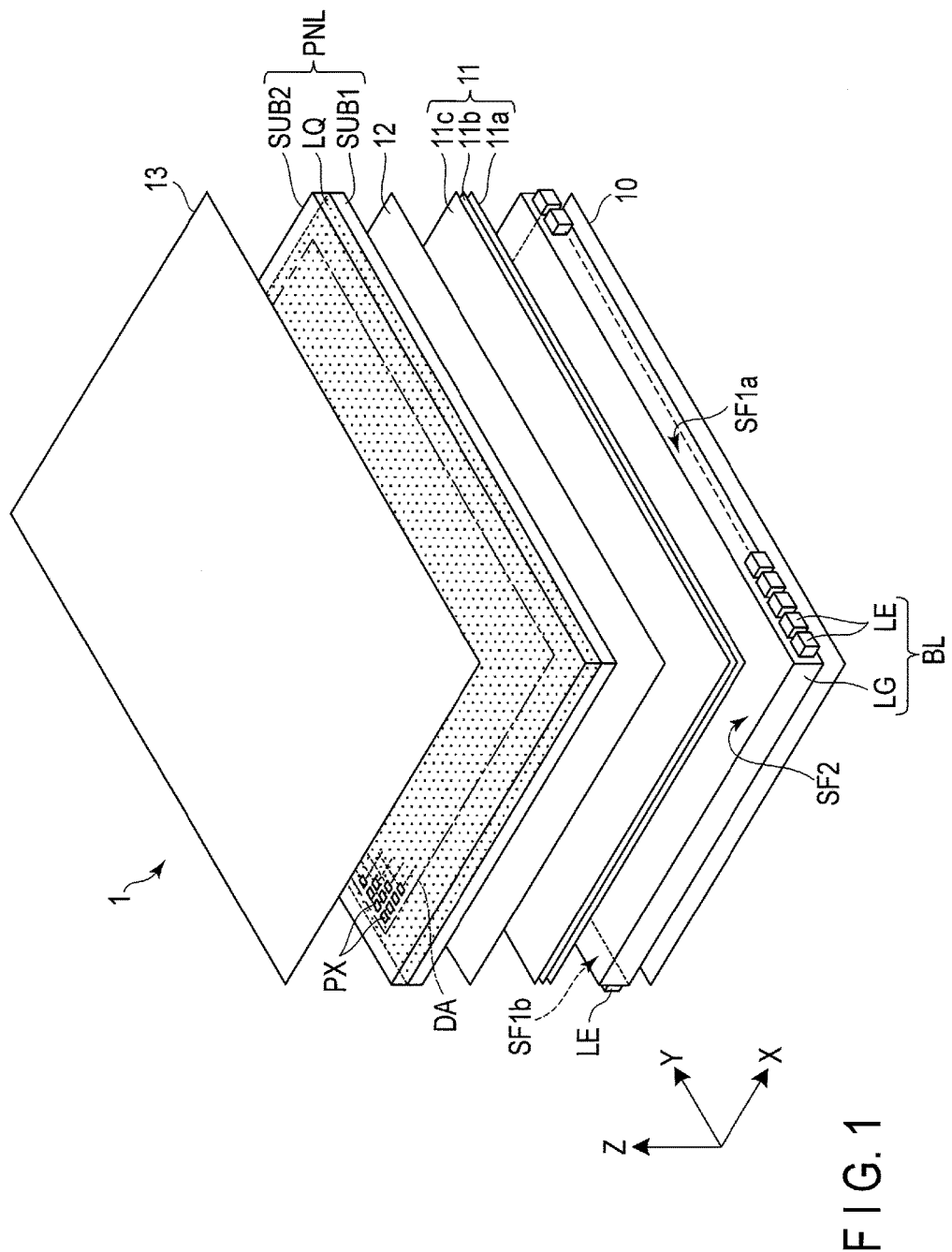
F I G. 1

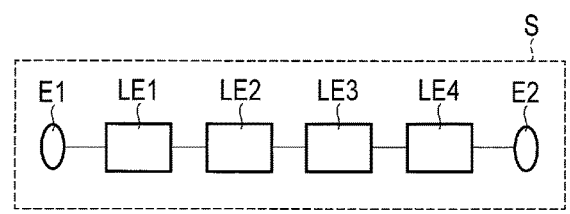
F I G. 2
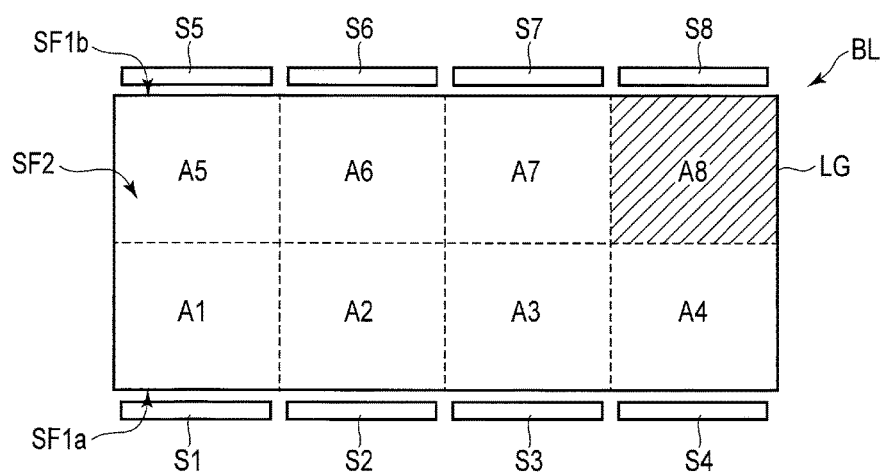
F I G. 3

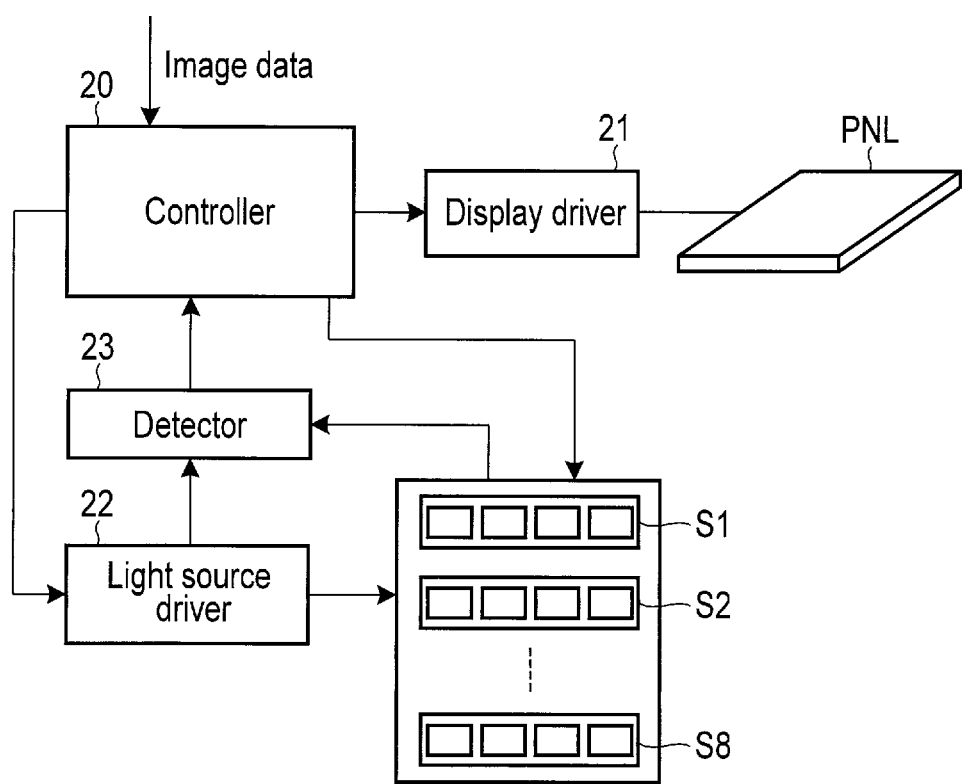
F I G. 4

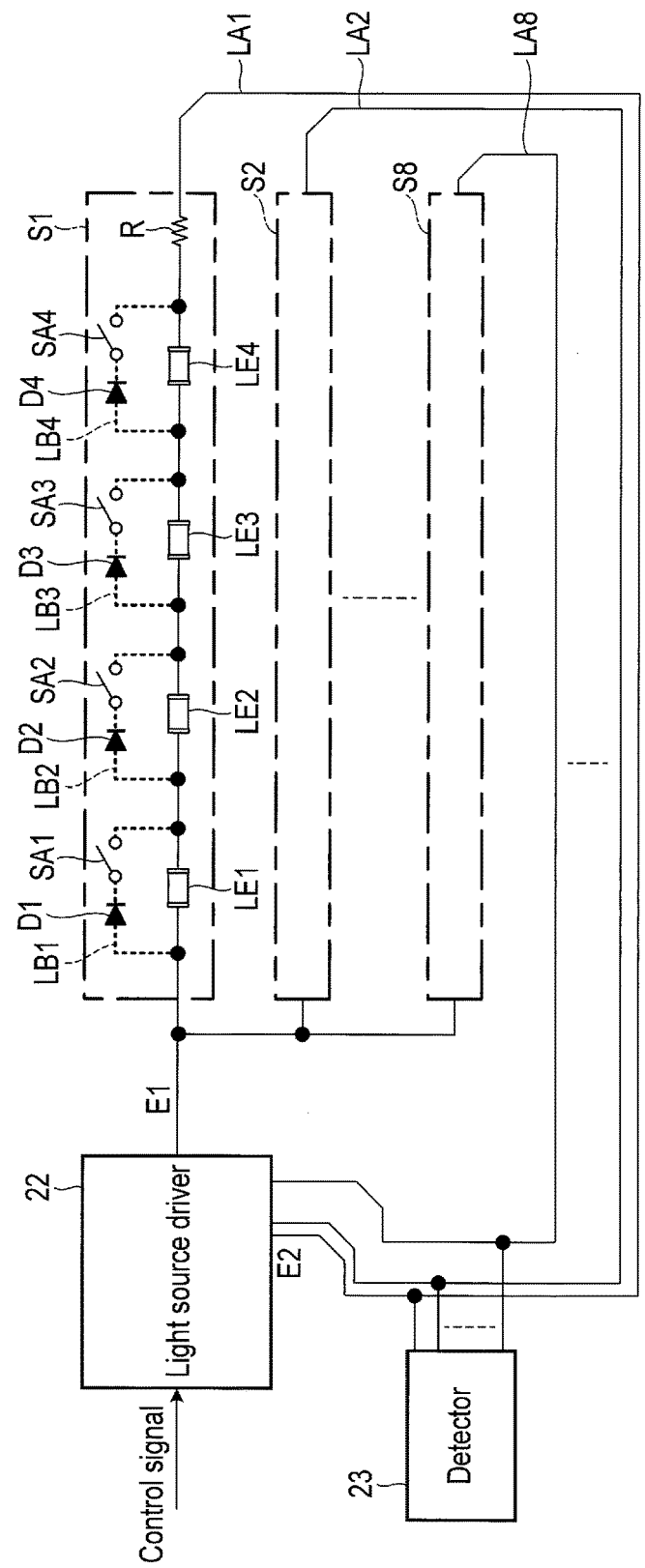
F I G. 5

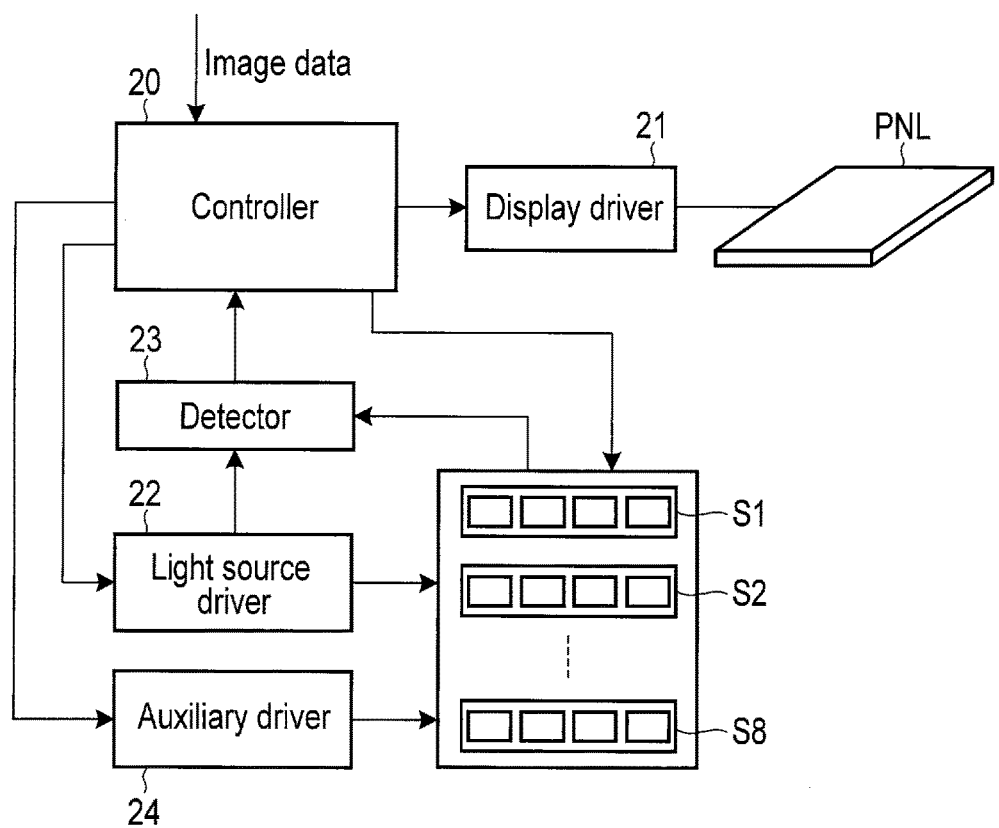
F I G. 9

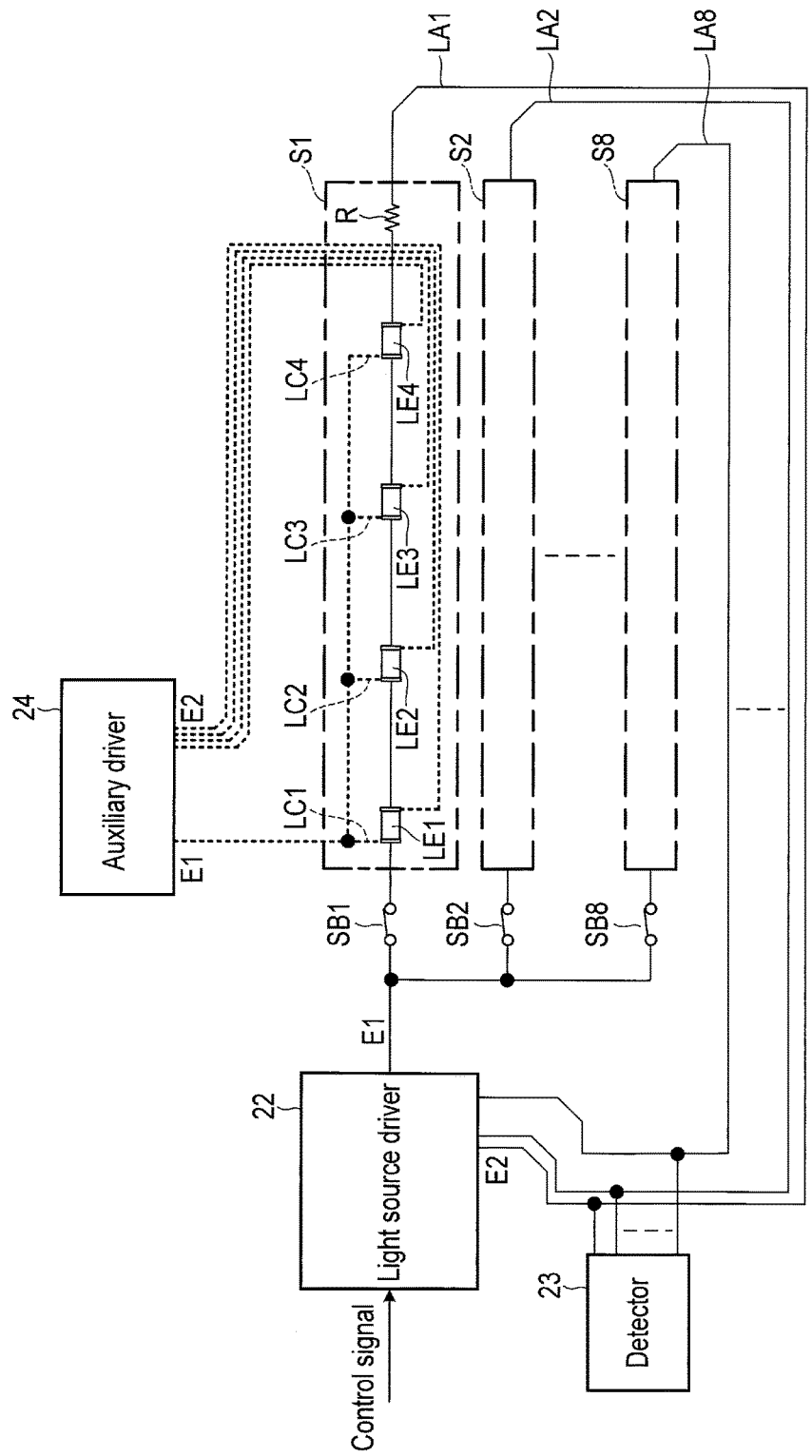
F I G. 10

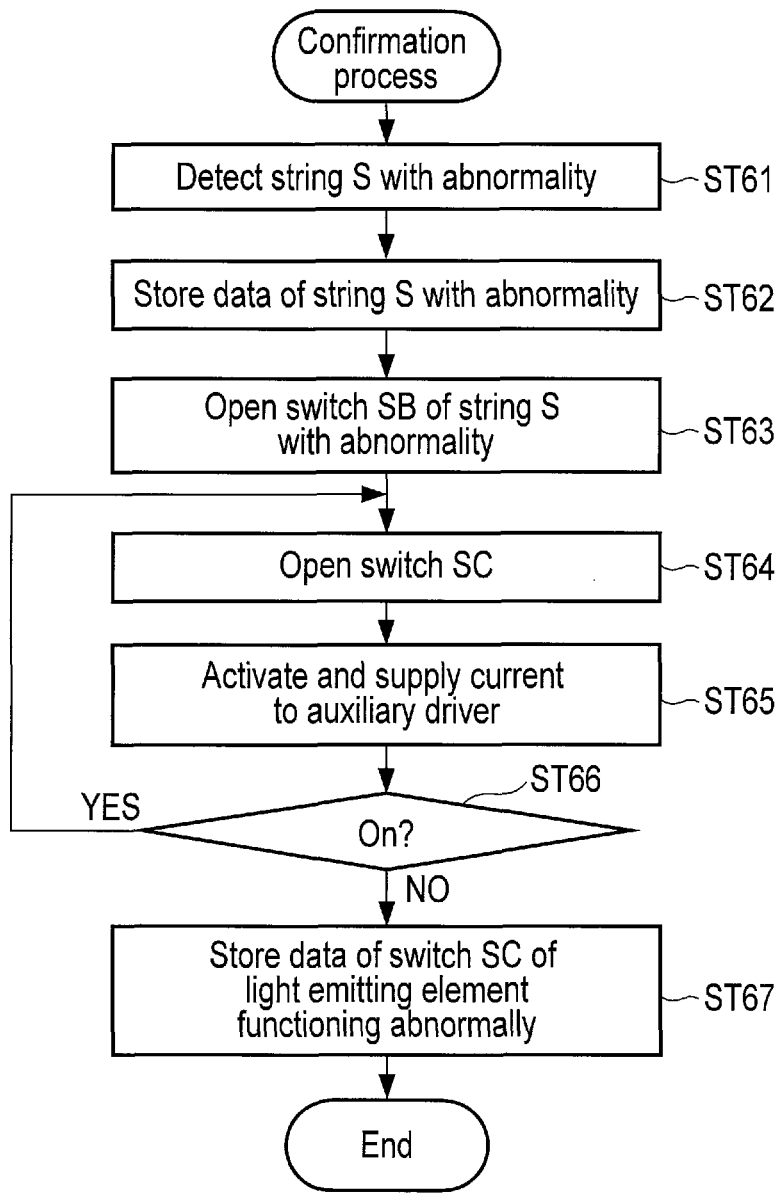
F I G. 14

LIGHT SOURCE DEVICE AND DISPLAY DEVICE

CROSS-REFERENCE TO RELATED APPLICATIONS

This application is based upon and claims the benefit of priority from Japanese Patent Application No. 2015-238453, filed Dec. 7, 2015, the entire contents of which are incorporated herein by reference.

FIELD

Embodiments described herein relate generally to a light source device and a display device.

BACKGROUND

A light source device, such as a backlight used for light transmissive display devices, includes a plurality of light emitting elements such as light emitting diodes, and a lightguide plate configured to take in the light from the light emitting elements and to pass the light through its exit surface which is opposed to the display panel.

In such a light source device, some of the light emitting elements may be connected in series. In that case, if an error occurs in one of the light emitting elements and a circuit including the light emitting element with an error is shut down, other light emitting elements functioning normally are also turned off due to the shutdown of the circuit. On the exit surface of the lightguide plate, the brightness decreases not only in the area corresponding to the light emitting element with an error but also in the area corresponding to the light emitting elements turned off due to the error, and the visibility of the image on the display device will significantly deteriorate.

BRIEF DESCRIPTION OF THE DRAWINGS

FIG. 1 is a schematic perspective view showing the structure of a display device in a disassembled manner.

FIG. 2 shows an example of the structure of a string.

FIG. 3 is a schematic plan view showing a positional relationship between a lightguide plate and strings.

FIG. 4 is a schematic block diagram showing part of control elements of the display device of a first embodiment.

FIG. 5 is a schematic circuit diagram of the first embodiment.

FIG. 9 is a schematic block diagram showing part of control elements of a display device of a second embodiment.

FIG. 10 is a schematic circuit diagram of the second embodiment.

FIG. 14 is a flowchart showing an example of a confirmation process of the third embodiment.

DETAILED DESCRIPTION

Figure 6:
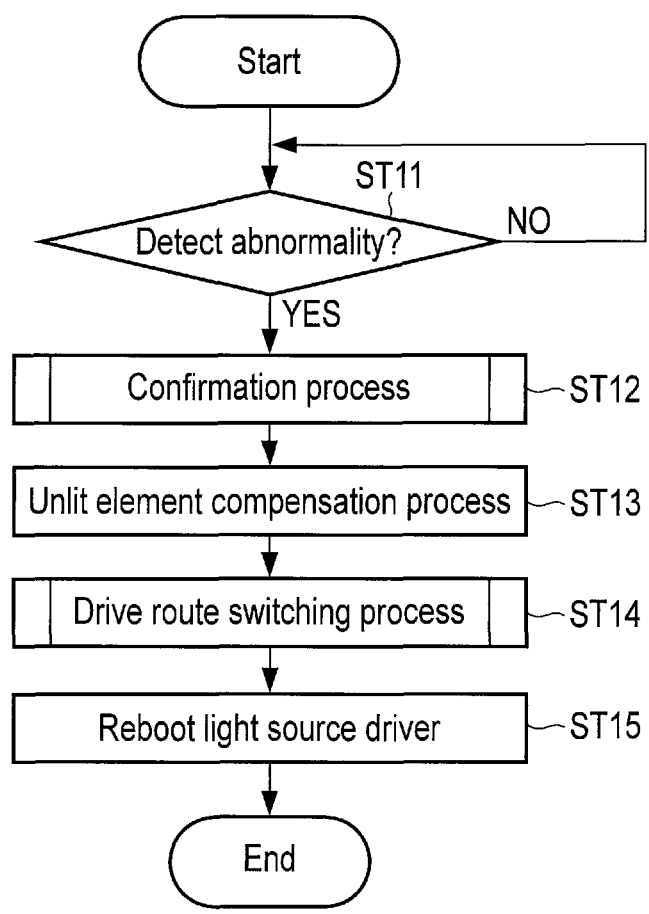
FIG. 6 is a flowchart showing an example of the operation of a backlight of the first embodiment.

Hereinafter, embodiments will be explained with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

(Structure Overview of Display Device)

Firstly, a common structure in the embodiments will be explained. Hereinafter, a liquid crystal display device will be exemplified for display device, and a backlight will be exemplified as a light source device of the liquid crystal display device. Such a liquid crystal display device can be used in various devices such as a smartphone, tablet, feature phone, personal computer, television, in-car device, and game console. Note that the display device is not limited to the liquid crystal display device, and it may be any other display devices using a light source device. Furthermore, the light source device is not limited to the backlight, and it may be any other light source devices such as a frontlight provided with reflective display devices.

FIG. 1 is a schematic perspective view showing the structure of a display device 1 in a disassembled manner. The display device 1 includes a backlight BL and a display panel PNL. The backlight BL includes a lightguide plate LG and a plurality of light emitting elements LE. The backlight BL is an example of illumination devices which supply light sufficient for the image display, and it may be referred to as a surface light source device.

In the example of FIG. 1, the lightguide plate LG and the display panel PNL are each formed in a rectangular shape having short sides along a first direction X and long sides along a second direction Y which is orthogonal to the first direction X. The lightguide plate LG and the display panel PNL are layered in a third direction Z which is orthogonal to both the first direction X and the second direction Y. Note that the shape of the lightguide plate LG and the display panel PNL is not limited to a rectangle and it may be any other shape.

The lightguide plate LG includes incident surfaces SF1 and an exit surface SF2. In the example of FIG. 1, the incident surfaces SF1 correspond to side surfaces of the lightguide plate LG extending along the second direction Y, and the exit surface SF2 corresponds to one of the main surfaces of the lightguide plate LG which is disposed at the display panel PNL side. In the following description, one of two incident surfaces SF1 will be referred to as an incident surface SF1a and the other will be referred to as an incident surface SF1b.

Light emitting elements LE are arranged on the incident surfaces SF1a and SF1b along the second direction Y. The light emitting elements LE arranged along the incident surface SF1a have light emitting surfaces opposed to the incident surface SF1a and the light emitting elements LE arranged along the incident surface SF1b have light emitting surfaces opposed to the incident surface SF1b. The light emitting elements LE are, for example, light emitting diodes. Alternatively, the light emitting elements LE may be other elements such as organic electroluminescent devices. The light emitting elements LE are divided into several groups, and such groups are separately mounted on flexible printed circuits. The light from the light emitting elements LE is incident on the incident surfaces SF1a and SF1b, passes through the lightguide plate LG, and exits from the exit surface SF2.

The display panel PNL is a light transmissive liquid crystal panel including a first substrate SUB1, second substrate SUB2, and liquid crystal layer LQ sealed between the first substrate SUB1 and the second substrate SUB2. The display panel PNL is opposed to the exit surface SF2 of the lightguide plate LG, and includes a display area DA in which a large number of pixels PX are arranged in a matrix along with the first direction X and the second direction Y. A pixel PX includes subpixels of, for example, red, green, and blue. A red subpixel includes a red color filter, green subpixel includes a green color filter, and blue subpixel includes a blue color filter. Such a pixel PX may further include a subpixel of, for example, white or yellow. The display panel PNL drives the pixels PX and displays a color image on the display area DA by selectively passing the light from the exit surface SF2 side of the lightguide plate LG through the display area DA.

Such a display panel PNL will be applied to active matrix liquid crystal display panels various modes such as a fringe field switching (FFS) mode, in-plane switching (IPS) mode, twisted nematic (TN) mode, polymer dispersed liquid crystal (PDLC) mode, optically compensated bend (OCB) mode, electrically controlled birefringence (ECB) mode, and vertical aligned (VA) mode.

The display device 1 further includes a reflective sheet 10, optical sheet group 11, first polarizer 12, and second polarizer 13. In the example of FIG. 1, the reflective sheet 10, optical sheet group 11, first polarizer 12, and second polarizer 13 are each formed in a rectangular shape having short sides along the first direction X and long side along the second direction Y. Note that the shape of the reflective sheet 10, optical sheet group 11, first polarizer 12, and second polarizer 13 are not limited to a rectangle and may be other shapes.

The reflective sheet 10 is adhered to one of the main surfaces of the lightguide plate LG, that is, a back surface opposite to the exit surface SF2, to reflect the light leaking from the back surface into the lightguide plate LG. An additional reflective sheet may be adhered to side surface of the lightguide plate LG except for the incident surfaces SF1.

The optical sheet group 11 includes, for example, a diffusion sheet 11a which diffuses light exiting from the exit surface SF2 of the lightguide plate LG, and a first prism sheet 11b and a second prism sheet 11c on which a number of prism lenses are formed.

The first polarizer 12 is disposed between the lightguide plate LG and the display panel PNL and is adhered to an outer surface of the first substrate SUB1 via, for example, an adhesive layer. The first polarizer 12 has a first polarization axis. The second polarizer 13 has a second polarization axis which is orthogonal to the first polarization axis. That is, the first polarizer 12 and the second polarizer 13 are in a crossed-Nicol positional relationship.

In the display device 1 structured as above, the light from the exit surface SF2 of the lightguide plate LG passes through the first polarizer 12 and enters the display panel PNL. The light entering the display panel PNL is linear polarization which is orthogonal to the first polarization axis of the first polarizer 12. When passing through the area corresponding to pixels PX turned off (specifically, subpixels turned off) in the liquid crystal layer LQ, that is, when passing through the area where liquid crystal molecules are in the initial alignment state, the polarization state of light does not substantially change and is absorbed by the second polarizer 13 which has the second polarization axis orthogonal to the first polarization axis.

On the other hand, when passing through the area corresponding to pixels PX turned on (specifically, subpixels turned on) in the liquid crystal layer LQ, that is, when passing through the area where the alignment of liquid crystal molecules is changed from the initial alignment state, the polarization state of light entering the display panel PNL changes and is at least partially orthogonal to the second polarization axis. The light partly passes through the second polarizer 13 and forms an image.

Now, the structure of the backlight BL will be detailed.

In the backlight BL, the light emitting elements LE are divided into some groups (and a group may be referred as a light emitting element group) to control turning on/off thereof. In the present application, a group will be referred to as a string S. FIG. 2 shows an example of the structure of a string S. In the example depicted, the string S includes four light emitting elements LE (LE1 to LE4) connected in series between the first electrode E1 and the second electrode E2. Note that, in the embodiments, the first electrode E1 is given as anode and the second electrode E2 is given as cathode.

FIG. 3 is a schematic plan view which shows an example of a positional relationship between the lightguide plate LG and strings S. In the example depicted, four strings S (S1 to S4) are arranged along the incident surface SF1a of the lightguide plate LG and four strings S (S5 to S8) are arranged along the incident surface SF1b of the lightguide plate LG. String S1 supplies light which mainly exits from subarea A1 of the exit surface SF2 of the lightguide plate LG, string S2 supplies light which mainly exits from subarea A2 of the exit surface SF2, string S3 supplies light which mainly exits from subarea A3 of the exit surface SF2, string S4 supplies light which mainly exits from subarea A4 of the exit surface SF2, string S5 supplies light which mainly exits from subarea A5 of the exit surface SF2, string S6 supplies light which mainly exits from subarea A6 of the exit surface SF2, string S7 supplies light which mainly exits from subarea A7 of the exit surface SF2, and string S8 supplies light which mainly exits from subarea A8 of the exit surface SF2.

In the example of FIG. 3, only light emitting elements LE1 to LE4 of string S8 are turned on as its subarea A8 is hatched to indicate its high brightness condition. Since light emitting elements LE1 to LE4 are turned on/off in each string S (S1 to S8), the exit surface SF2 of the backlight BL can be selectively illuminated for each subarea A (A1 to A8). Such a driving method of the backlight will be referred to as divisional drive or partial drive.

Note that the number of the light emitting elements LE in a string S is not limited to four, and it may be two, three, five or more. Note that the number of the strings S in the backlight BL is not limited to eight, and it may be two to seven, nine or more.

When light emitting elements LE1 to LE4 in a string S are connected together in series as in FIG. 2, a breakdown of one of the light emitting elements LE may cause the other normally functioning light emitting elements LE turn off. In that case, the whole subarea A corresponding to the string S including the light emitting element LE functioning abnormally is turned off, and an image on the display area DA corresponding to the subarea A cannot be recognized.

In the following first to third embodiments, means to prevent such a problem will be presented.

First Embodiment

FIG. 4 is a schematic block diagram showing a part of control elements of the display device 1 of the first embodiment. The display device 1 includes a controller 20, display driver 21 (first driver), light source driver 22, and detector 23 as main control elements.

The controller 20 may include, for example, a flexible printed circuit extending from the display panel PNL and an electronic component such as an IC mounted on the printed circuit. The controller 20 may include any other electronic component connected to the flexible printed circuit.

The display driver 21 includes, for example, an IC mounted on the display panel PNL and a circuit formed on the display panel PNL. The light source driver 22 may include, for example, a circuit board electrically connected to each light emitting element LE and an electronic component such as an IC mounted on the circuit board.

The controller 20 sequentially receives image data for one frame to be displayed on the display area DA from a main board or the like of the electronic device in which the display device 1 is mounted. The image data include, for example, colors displayed by each pixel PX in the display area DA and its brightness. Using the image data received, the controller 20 sends a control signal, used for the drive of each pixel PX on the display panel PNL, to the display driver 21. The display driver 21 selectively turns on/off each pixel PX corresponding to the control signal sent from the controller 20.

Then, the controller 20 analyzes the image data received, determines the brightness of subareas A1 to A8, and sends a control signal to the light source driver 22 to illuminate subareas A1 to A8 with the brightness determined. The light source driver 22 drives light emitting elements LE1 to LE4 of each of strings S1 to S8 on the basis of the control signals sent from the controller 20. For example, the light source driver 22 differentiates the voltage to be applied to light emitting elements LE1 to LE4 between strings S1 to S8 to adjust the brightness of each of subareas A1 to A8.

The detector 23 detects abnormality in each of strings S1 to S8. An abnormality in each of strings S1 to S8 can be detected based on Fault signals sent from Fault pins of the light source driver 22 or waveforms (voltage waveforms or current waveforms) from the second electrode E2 of each of strings S1 to S8. The detector 23 should include a function to detect an abnormality using at least one of the above signals. The light source driver 22 sends a fault signal if, for example, any one of the waveforms from the second electrode E2 of each of strings S1 to S8 differs from its normal state. The detector 23 may include, for example, a microcomputer or an IC. The detector 23 may be referred to as a detection module, detection circuit, or detection device.

The abnormality detected by the detector 23 may include, for example, a case where at least one of light emitting elements LE1 to LE4 in each of strings S1 to S8 cannot emit light by a breakdown, or a case where a voltage source for a light emitting element LE is stopped because of a bad connection between the light emitting element LE and a line.

FIG. 5 is a schematic view showing a circuit including strings S1 to S8, light source driver 22, and detector 23. In the example depicted, the light source driver 22 has a line connected to a pin in the first electrode E1 side branching to correspond to each of strings S1 to S8 such that branching lines LA1 to LA8 are connected to pins of the light source driver 22 in the second electrode E2 side. Lines LA1 to LA8 correspond to the first circuit used when there is no abnormality in the light emitting elements LE and are depicted in solid lines in the example of FIG. 5.

Line LA1 connects light emitting elements LE1 to LE4 of string S1 in series. Line LA1 includes a restriction resistor R used to prevent a breakdown of light emitting elements LE1 to LE4. Similarly, lines LA2 to LA8 connect light emitting elements LE1 to LE4 of strings S2 to S8 in series, respectively, and each include a restriction resistor R.

In the backlight BL of the present embodiment, each of strings S1 to S8 includes bypass routes LB (LB1 to LB4), diodes D (D1 to D4), and switches SA (SA1 to SA4), provided with light emitting elements LE1 to LE4 therein, respectively. The diodes D have a diode forward voltage Vf which is substantially the same as the light emitting element LE, for example. The switches SA are opened and closed (turned on/off) under the control of the controller 20.

In string S1, the bypass route LB1 bypasses light emitting element LE1 and is connected to line LA1, bypass route LB2 bypasses light emitting element LE2 and is connected to line LA1, bypass route LB3 bypasses light emitting element LE3 and is connected to line LA1, and bypass route LB4 bypasses light emitting element LE4 and is connected to line LA1. The bypass routes LB1 to LB4 correspond to a second circuit which is used when there is an abnormality in light emitting elements LE1 to LE4, and are depicted in dotted lines in the example of FIG. 5.

Diode D1 and switch SA1 are provided with the bypass route LB1, diode D2 and switch SA2 are provided with the bypass route LB2, diode D3 and switch SA3 are provided with the bypass route LB3, and diode D4 and switch SA4 are provided with the bypass route LB4. Diode D1 and switch SA1 are parallel with light emitting element LE1, diode D2 and switch SA2 are parallel with light emitting element LE2, diode D3 and switch SA3 are parallel with light emitting element LE3, and diode D4 and switch SA4 are parallel with light emitting element LE4.

The circuit structure of string S1 is applied to strings S2 to S8 similarly. In the example of FIG. 5, the detector 23 is connected to lines LA1 to LA8 between strings S1 to S8 and the pins of the light source driver 22 in the second electrode E2 side. The detector 23 monitors the waveforms from the second electrode E2 of each of strings S1 to S8 through lines LA1 to LA8 and detects an abnormality in strings S1 to S8, if any.

Now, an example of the control of the backlight BL will be explained.

FIG. 6 is a flowchart showing an example of the operation of backlight BL. In the present embodiment, the operation of the flowchart is performed by the controller 20. Note that, the operation of the flowchart may be performed by a control module other than the controller 20, or may be performed by the controller 20 and any other control module working in cooperation.

During the operation of device including the display device 1, the controller 20 monitors strings S1 to S8 to determine whether or not there is an abnormality (step ST11). If there is no abnormality (NO in step ST11), the control is performed normally. That is, the controller 20 opens all of switches SA1 to SA4 in strings S1 to S8, and the light source driver 22 drives light emitting elements LE1 to LE4 in strings S1 to S8 by the first circuit which is depicted in solid lines in the example of FIG. 5.

On the other hand, if there is an abnormality in any of the light emitting elements LE, the detector 23 detects an abnormality in the string S in the light emitting element LE based on Fault signals from the light source driver 22 or waveforms form the second electrode E2 side of lines LA1 to LA8. Upon detection of an abnormality in a string S, the detector 23 reports the abnormality in the string S to the controller 20. Then, the controller 20 determines there is an abnormality (YES in step ST11) and performs a confirmation process to confirm in which light emitting element LE the abnormality has occurred (step ST12).

Figure 7:
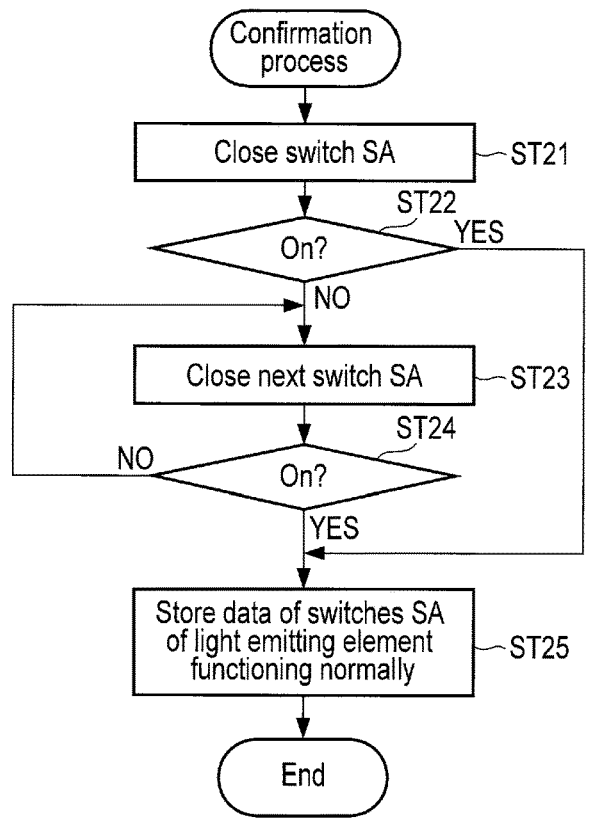
FIG. 7 is a flowchart showing an example of a confirmation process of the first embodiment.

FIG. 7 is a flowchart showing an example of the confirmation process in step ST12. Initially, the controller 20 closes switch SA1 of string S1 and opens switches SA2 to SA4 of string S1 to send the control signals to turn on string S1 to the light source driver 22 (step ST21). Then, the controller 20 determines whether or not string S1 is turned on (step ST22). The determination may be performed based on an output of Fault signals from the light source driver 22 in response to the operation of step ST21, or a detection of an abnormality in string S1 by the detector 23 in response to the operation of step ST21.

That is, when Fault signals are output or the detector 23 detects an abnormality in string S1, there is an abnormality in any of light emitting elements LE2 to LE4 in string S1, and string S1 is not turned on (NO in step ST22). In that case, the controller 20 closes the next switch SA, specifically, switch SA2 of string S1 and opens the other switches SA (step ST23). Then, the controller 20 determines whether or not the string S including the switch SA closed in step ST23 is turned on (step ST24). The determination is performed similarly to step ST22.

If the string S is not turned on (NO in step ST24), the controller 20 performs steps ST23 and ST24. Steps ST23 and ST24 are repeated until the string S including the switches SA closed in step ST23 is turned on. In this cycle, after switches SA2 to SA4 of string S1 are closed sequentially, switches SA1 to SA4 of string S2, switches SA1 to SA4 of string S3, switches SA1 to SA4 of string S4, switches SA1 to SA4 of string S5, switches SA1 to SA4 of string S6, switches SA1 to SA4 of string S7, and switches SA1 to SA4 of string S8 are closed in the order stated above.

If a string S is turned on while any one of the switches SA therein is closed (YES in step ST24), it means that there is an abnormality in a light emitting element LE corresponding to the closed switch SA. The controller 20 stores identification data of a switch SA corresponding to each light emitting element LE functioning normally in a memory (step ST25). Note that the data to be stored in step ST25 should be data to identify a light emitting element LE functioning abnormally. Therefore, instead of the identification data of the switches SA corresponding to the light emitting elements LE functioning normally, identification data of a switch SA corresponding to each light emitting element LE functioning abnormally, identification data of each light emitting element LE functioning normally, or identification data of each light emitting element LE functioning abnormally may be stored in the memory. The confirmation process ends through step ST25.

As shown in FIG. 6, the controller 20 performs an unlit element compensation process after the confirmation process (step ST13). The unlit element compensation process is a process to set the brightness of the light emitting elements LE functioning normally higher than that of the normal state to compensate for the lack of brightness in the subarea A to which the light from the unlit light emitting element LE functioning abnormally. For example, the controller 20 increases the brightness of strings S adjacent to the string S including the unlit light emitting element LE and the brightness of a string S opposed to the string S including the unlit light emitting element LE with the lightguide plate LG interposed therebetween higher than their normal degrees. Or, the controller 20 increases the brightness of the string S including the unlit light emitting element LE higher than its normal degree. Such brightness setting may be stored in a memory of the controller 20 to be reflected on control signals later sent to the light source driver 22, or may be stored in a memory of the light source driver 22 to be reflected on a driving voltage later applied to strings S1 to S8.

Figure 8:
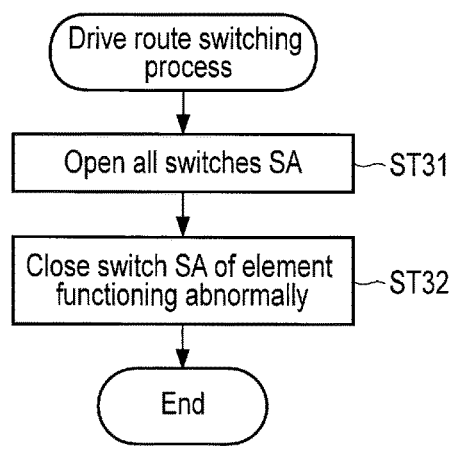
FIG. 8 is a flowchart showing an example of a drive route switching process of the first embodiment.

The controller 20 performs a drive route switching process after step ST13 (step ST14). FIG. 8 is a flowchart showing an example of the drive route switching process in step ST14. Firstly, the controller 20 opens all of switches SA1 to SA4 of strings S1 to S8 (step ST31). Secondly, the controller 20 closes the switches SA corresponding to the light emitting elements LE functioning abnormally on the basis of the identification data stored in step ST25 (step ST32). The drive route switching process ends through step ST32.

Through the drive route switching process, a drive route which bypasses a light emitting element LE functioning abnormally is formed by a bypass route LB in which a switch SA is closed and a line LA to which the bypass route LB is connected.

As shown in FIG. 6, the controller 20 reboots the light source driver 22 after the drive route switching process (step ST15). If the light source driver 22 has a function to limit the voltage applied to a string S in which an abnormality is occurring, the light source driver 22 returns to its normal operation by the reboot. A series of the operation of the controller 20 ends through step ST15. Then, the operation of the controller 20 returns to step ST11 to monitor any abnormality.

After the reboot of the light source driver 22, as performed before the occurrence of the abnormality, the controller 20 supplies control signals used to illuminate subareas A1 to A8 to the light source driver 22, and the light source driver 22 drives the light emitting elements LE of strings S1 to S8 corresponding to the control signals sent from the controller 20. Since the switch SA corresponding to the light emitting element LE functioning abnormally is closed, total shutoff of the string S including the light emitting element LE functioning abnormally can be prevented, and the visibility of the image on the display area DA corresponding to the string S can be maintained.

Second Embodiment

The second embodiment will be described. In this section, only the parts different from the first embodiment will be focused, and same or similar elements to those of the first embodiment will be referred to by the same reference numbers and their explanation will be omitted.

FIG. 9 is a schematic block diagram showing a part of control elements of a display device 1 of the second embodiment. The display device 1 includes, in addition to the light source driver 22, an auxiliary driver 24 (second driver) used for the drive of the light emitting elements LE. In this respect, the display device 1 of the second embodiment differs from that of the first embodiment.

FIG. 10 is a schematic view showing a circuit including strings S1 to S8, light source driver 22, detector 23, and auxiliary driver 24. In the example depicted, the circuit does not include a bypass route LB, diode D, or switch SA unlike the first embodiment while lines of an auxiliary system are provided therewith. Specifically, a line connected to a pin in the first electrode E1 side of the auxiliary driver 24 branches into a plurality of lines LC (LC1 to LC4) corresponding to light emitting elements LE1 to LE4 of string S1. Line LC1 is connected to a pin in the second electrode E2 side of the auxiliary driver 24 through light emitting element LE1, line LC2 is connected to a pin in the second electrode E2 side of the auxiliary driver 24 through light emitting element LE2, line LC3 is connected to a pin in the second electrode E2 side of the auxiliary driver 24 through light emitting element LE3, and line LC4 is connected to a pin in the second electrode E2 side of the auxiliary driver 24 through light emitting element LE4. Such lines of the auxiliary system correspond to the second circuit used when there is an abnormality in light emitting elements LE1 to LE4 and are depicted in dotted lines in FIG. 10.

Furthermore, in the example depicted, switches SB (SB1 to SB8) are provided with lines LA1 to LA8. Switches SB1 to SB8 are opened and closed (turned on/off) under the control of the controller 20. If all of the light emitting elements LE function normally, switches SB1 to SB8 are all closed.

An auxiliary system line as in string S1 is provided with each of strings S2 to S8. In the present embodiment, the lines are connected to the auxiliary driver 24; however, an auxiliary driver 24 may be provided with each string S and an auxiliary system line for each string S may be connected to each auxiliary driver 24.

Now, an example of the control of backlight BL will be explained. The basic flow of the control is similar to that of FIG. 6 while the confirmation process in step ST12 and the drive route switching process of step ST14 differ from those of the first embodiment.

Figure 11:
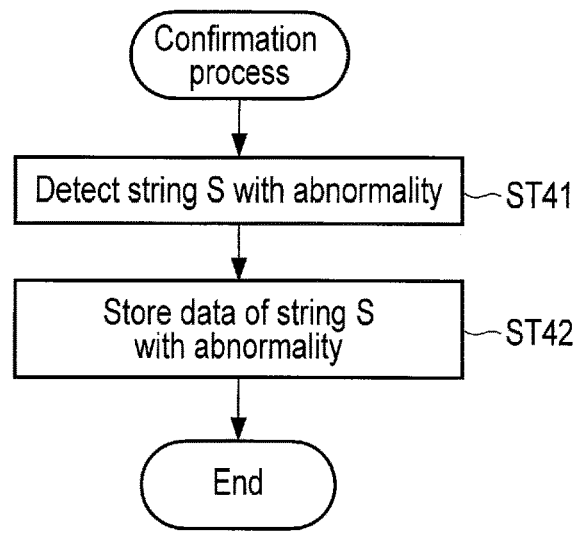
FIG. 11 is a flowchart showing an example of a confirmation process of the second embodiment.

FIG. 11 is a flowchart showing a confirmation process of the present embodiment. Firstly, the controller 20 detects a string S in which an abnormality occurs (step ST41). For example, if the detector 23 is configured to send data to identify the string S having an abnormality together with the data to report the occurrence of the abnormality to the controller 20, the controller 20 can detects the string S with abnormality by referring to the data from the detector 23. The controller 20 stores the identification data of the string S with abnormality in a memory (step ST42) after step ST41. Note that the data to be stored in step ST42 should be data to identify a string S with abnormality. Thus, instead of the identification data of a string S with abnormality, identification data of strings S functioning normally may be stored in the memory. The confirmation process ends through step ST42.

Figure 12:
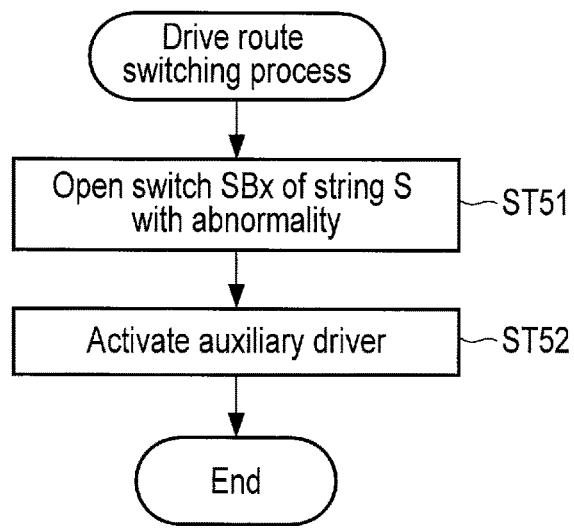
FIG. 12 is a flowchart showing an example of a drive route switching process of the second embodiment.

FIG. 12 is a flowchart showing an example of a drive route switching process of the present embodiment. Firstly, the controller 20 opens a switch SB corresponding to the string S with abnormality based on the identification data stored in step ST42 (step ST51). Then, the controller 20 activates the auxiliary driver 24 (step ST52). The drive route switching process ends through step ST52.

After the drive route switching process, the controller 20 reboots the light source driver 22 as in the first embodiment. Then, the auxiliary driver 24 drives a string S with abnormality such that light emitting elements LE of the string S are turned on except the light emitting element LE functioning abnormally. Therefore, total shutoff of the string S including the light emitting element LE functioning abnormally can be prevented, and the visibility of the image on the display area DA corresponding to the string S can be maintained.

For example, strings S functioning normally are driven by the light source driver 22 as in the normal operation. In that case, the controller 20 sets the target driven by the auxiliary driver 24 to the string S with abnormality alone when activating the auxiliary driver 24, and the controller 20 sends control signals used for the drive of the strings S functioning normally to the light source driver 22 and sends control signals used for the drive the string S functioning abnormally to the auxiliary driver 24. With such a structure, a driver whose performance and cost are relatively low can be used as the auxiliary driver 24.

The auxiliary driver 24 may be configured to not only identify a light emitting element LE functioning abnormally but also exclude such a light emitting element LE functioning abnormally from the target of drive. In that case, the auxiliary driver 24 may be configured to detect an abnormality in the light emitting elements LE on the basis of the waveforms from lines LB1 to LB4 connected to the string S with abnormality, which are measured in the second electrode E2 side, such that the auxiliary driver 24 itself can detect a light emitting element LE functioning abnormally and exclude such a light emitting element LE functioning abnormally from the target of drive.

Third Embodiment

Now, the third embodiment will be explained. In this section, only the parts different from the first and second embodiments will be focused, and same or similar elements to those of the first and second embodiments will be referred to by the same reference numbers and their explanation will be omitted.

Figure 13:
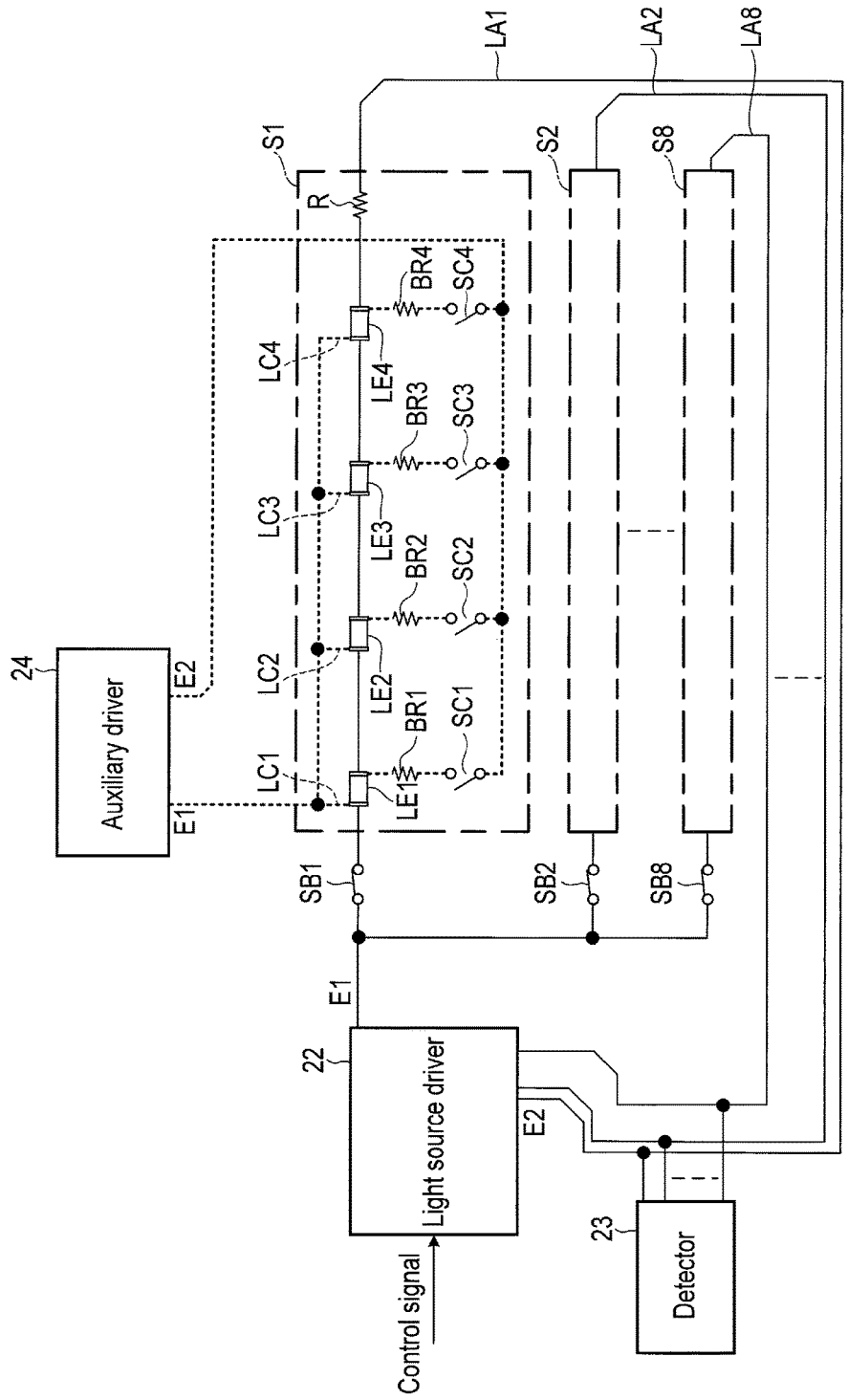
FIG. 13 is a schematic circuit diagram of a third embodiment.

In the present embodiment, the display device 1 includes an auxiliary driver 24 as in the second embodiment. However, the connection between the auxiliary driver 24 and the light emitting elements LE differs from that of the second embodiment. FIG. 13 is a schematic view showing a circuit including strings S1 to S8, light source driver 22, detector 23, and auxiliary driver 24. In the example depicted, a line connected to a pin of the auxiliary driver 24 in the first electrode E1 side branches into a plurality of lines LC (LC1 to LC4) corresponding to light emitting elements LE1 to LE4 of string S1, and lines LC1 to LC4 merge into a line connected to a pin of the auxiliary driver 24 in the second electrode E2 side.

Furthermore, line LC1 includes a ballast resistor BR1 and a switch SC1, line LC2 includes a ballast resistor BR2 and switch SC2, line LC3 includes a ballast resistor BR3 and a switch SC3, and line LC4 includes a ballast resistor BR4 and switch SC4. The resistance of each of ballast resistors BR1 to BR4 is set such that the voltage applied from the auxiliary driver 24 to light emitting elements LE1 to LE4 can be suppressed sufficiently. The resistance is greater than that of the light emitting elements LE and is used to distribute the current from the auxiliary driver 24 approximately even to lines LC1 to LC4. In such a structure, the auxiliary driver 24 can achieve pseudo-parallel drive of light emitting elements LE1 to LE4. The lines of an auxiliary system including lines LC1 to LC4 correspond to the second circuit used when there is an abnormality in light emitting elements LE1 to LE4 and are depicted in dotted lines in FIG. 13.

An auxiliary system line as in string S1 is provided with each of strings S2 to S8. In the present embodiment, the lines are connected to the auxiliary driver 24; however, an auxiliary driver 24 may be provided with each string S and an auxiliary system line for each string S may be connected to each string S through each auxiliary driver 24.

Now, an example of the control of backlight BL will be explained. The basic flow of the control is similar to that of FIG. 6 while the confirmation process in step ST12 and the drive route switching process of step ST14 differ from those of the first embodiment.

FIG. 14 is a flowchart showing an example of a confirmation process of the present embodiment. Firstly, the controller 20 detects a string S in which an abnormality occurs (step ST61) and stores identification data of the string with abnormality in a memory (step ST62), similarly to steps ST41 and ST42 of the second embodiment.

Then, the controller 20 opens a switch SB of the string S with abnormality (step ST63). Furthermore, the controller 20 closes a switch SC, for example, switch SC1, of the string S with abnormality (step ST64). Here, the switches SC other than the closed switch SC1 are opened. Then, the controller 20 activates the auxiliary driver 24 and supplies current through the lines of the auxiliary system of the string S with abnormality (step ST65).

The controller 20 determines whether or not the light emitting element LE corresponding to the switch SC closed in step ST64 is turned on by the current supply in step ST65 (step ST66). For example, the auxiliary driver 24 is configured to detect whether or not a light emitting element LE is turned on based on waveforms from the lines of the auxiliary system of the string S with abnormality, which are measured in the second electrode E2 side, and based on a result of the detection, the controller 20 performs the above determination.

If the light emitting element LE corresponding to the switch SC closed in step ST64 is turned on (YES in step ST66), the controller 20 determines that the light emitting element LE functions normally. Then, the controller 20 repeats steps ST64 to ST66. That is, the controller 20 closes another switch SC and closes the other switches SC in the string with abnormality, instructs the auxiliary driver 24 to supply current to the lines of the auxiliary system of the string S with abnormality, and determines whether or not a light emitting element LE corresponding to the switch SC currently closed in step ST64 is turned on. This operation is repeated until a light emitting element LE which is not turned on is found in step ST66.

If there is a light emitting element LE which is not turned on in step ST66 (NO in step ST66), the controller 20 determines that the light emitting element LE functions abnormally. Then, the controller 20 stores identification data of the switch SC corresponding to the light emitting element LE, that is, the identification data of the switch SC closed in step ST64 in the memory (step ST67). Note that the data to be stored in step ST67 should be data to identify a light emitting element LE functioning abnormally. Thus, instead of the identification data of the switch SC corresponding to the light emitting element LE functioning abnormally, identification data of switches SC corresponding to light emitting elements LE functioning normally, identification data of light emitting elements LE functioning normally, or identification data of a light emitting element LE functioning abnormally may be stored in the memory. The confirmation process ends through step ST67.

Figure 15:
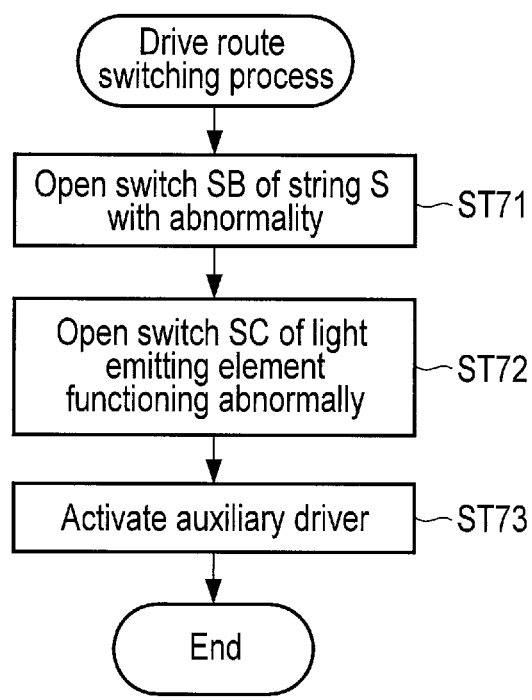
FIG. 15 is a flowchart showing an example of a drive route switching process of the third embodiment.

FIG. 15 is a flowchart showing an example of a drive route switching process of the present embodiment. Firstly, the controller 20 opens a switch SB corresponding to the string S with abnormality based on the identification data stored in step ST62 (step ST71). Then, based on the identification data stored in step ST67, the controller 20 opens a switch SC corresponding to the light emitting element LE functioning abnormally and closes the switches SC corresponding to the other light emitting elements LE in the string S (step ST72). Then, the controller 20 activates the auxiliary driver 24 (step ST73). The drive route switching process ends through step ST73.

After the drive route switching process, the controller 20 reboots the light source driver 22 as in the first embodiment. Then, the auxiliary driver 24 drives the string with abnormality, and the light emitting elements LE of the string S are turned on except for the light emitting element LE functioning abnormally. Therefore, total shutoff of the string S including the light emitting element LE functioning abnormally can be prevented, and the visibility of the image on the display area DA corresponding to the string S can be maintained.

For example, strings S functioning normally are driven by the light source driver 22 as in the normal operation. In that case, the controller 20 sets the target driven by the auxiliary driver 24 to the string S with abnormality alone when activating the auxiliary driver 24, and the controller 20 sends control signals used for the drive of the strings S functioning normally to the light source driver 22 and sends control signals used for the drive the string S functioning abnormally to the auxiliary driver 24. With such a structure, a driver whose performance and cost are relatively low can be used as the auxiliary driver 24.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, upon detection of an abnormality in any of light emitting elements LE, the display device 1 or the backlight BL may send a message displayed on the display area DA or an audio output to a speaker of the device which includes the display device 1 to notify the user. Note that the user, on seeing an image displayed on the display area DA partially dimming because a light emitting element LE functioning abnormally has failed to light, may report an abnormality in the display device 1.

The device including the display device 1 may perform a process to detect an abnormality in strings S at its power-on such that steps ST12 to ST15 are performed if an abnormality is detected.

In the above embodiments, the display device 1 and the backlight BL operate in response to a single light emitting element LE functioning abnormally amongst others. However, the structures of the embodiments are effective even in a case where there are a plurality of light emitting elements LE functioning abnormally. For example, in the first embodiment, a plurality of switches SA corresponding to a plurality of light emitting elements LE functioning abnormally are closed. Furthermore, in the second embodiment, if a plurality of light emitting elements LE functioning abnormally are scattered in strings S, switches SB corresponding to the strings S with abnormality are opened and the strings S are driven by the auxiliary driver 24. Furthermore, in the third embodiment, a plurality of switches SC corresponding to a plurality of light emitting elements LE functioning abnormally are closed, and a switch SB of each string S including the closed switches SC is opened.

In the second and third embodiments, the whole light emitting elements LE1 to LE4 of each string S are connected to the auxiliary driver 24. However, the connection to the auxiliary driver 24 may be limited to some of light emitting elements LE1 to LE4 in each string S. In that case, even a driver of lower performance will suffice the auxiliary driver 24.

The second circuits depicted in dotted lines in FIGS. 5, 10, and 13 can be changed to various forms. For example, in the first embodiment, some bypass route LB may be connected to a line LA bypassing a plurality of light emitting element LE. Specifically, if a string S includes four light emitting elements LE1 to LE4, the string S will include a bypass route LB bypassing light emitting elements LE1 and LE2 and a bypass route LB bypassing light emitting elements LE3 and LE4, for example. Furthermore, in the second and third embodiments, a line LC may connect a plurality of light emitting elements LE in series. Specifically, if a string S includes four light emitting elements LE1 to LE4, the string S includes a line LC connecting light emitting elements LE1 and LE2 in series and a line LC connecting light emitting elements LE3 and LE4 in series, for example.

In each embodiment, the backlight BL used as an example of a light source device can conform to a partial drive operation. However, the structure of the second circuit which is depicted in dotted lines in FIGS. 5, 10, and 13 can be applied to a backlight unit BL which does not conform to a partial drive operation. Furthermore, the structure of the second circuit can be applied to various light source devices such as a frontlight.

(Note)

From the disclosure of the present application, the following light source device, and the following display device including such a light source device can be achieved.

[1] A light source device comprising:

a plurality of light emitting elements including at least a first light emitting element and a second light emitting element;

a lightguide plate including a first surface on which light from the first light emitting element and the second light emitting element is incident and a second surface through which the light incident on the first surface exits;

a first circuit configured to connect the first light emitting element and the second light emitting element in series;

a second circuit configured to bypass each of the first light emitting element and the second light emitting element, the second circuit which is different from the first circuit; and a controller configured to turn on the first light emitting element and the second light emitting element using the first circuit if the first light emitting element and the second light emitting element function normally, and if either the first light emitting element or the second light emitting element functions abnormally, to turn on the light emitting element functioning normally using the second circuit.

[2] The light source device according to [1], comprising a first light emitting element group and a second light emitting element group each including the first light emitting element and the second light emitting element, wherein the first circuit and the second circuit are provided with the first light emitting element group and the second light emitting element group, respectively, and light from the first light emitting element and the second light emitting element of the first light emitting element group is incident on the first surface of the lightguide plate and exits from a first area of the second surface of the lightguide plate, and light from the first light emitting element and the second light emitting element of the second light emitting group is incident on the first surface of the lightguide plate and exits from a second area of the second surface of the lightguide plate, and the controller is configured to individually turn on and turn off the first light emitting element and the second light emitting element of the first light emitting element group and the first light emitting element and the second light emitting element of the second light emitting element group.

[3] The light source device according to [2], wherein the first light emitting element group and the second light emitting element group each have one end which is connected to a first electrode and the other end which is connected to a second electrode, the light source device further comprises a detector configured to detect an abnormality in the first light emitting element group and the second light emitting element group on the basis of a voltage waveform from the second electrode side of the first circuit of the first light emitting element group and the second light emitting element group, and the controller is configured to turn on the first light emitting element and the second light emitting element of the light emitting element group from which an abnormality is not detected by the detector between the first light emitting element group and the second light emitting element group using the first circuit and configured to turn on either the first light emitting element or the second light emitting element, whichever functions normally, of the light emitting element group from which an abnormality is detected by the detector between the first light emitting element group and the second light emitting element group using the second circuit.

[4] The light source device according to [3], wherein the controller is configured to, if the detector detects an abnormality in either the first light emitting element group or the second light emitting element group, increase the brightness of the other group functioning normally to be greater than that of a normal operation.

[5] The light source device according to [1], wherein the second circuit includes a first bypass route connected to the first circuit bypassing the first light emitting element, a second bypass route connected to the first circuit bypassing the second light emitting element, a first switch provided with the first bypass route, and a second switch provided with the second bypass route, wherein the controller is configured to turn on the first light emitting element and the second light emitting element by supplying current to the first circuit while opening the first switch and the second switch if the first light emitting element and the second light emitting element function normally, and if an abnormality occurs in either the first light emitting element or the second light emitting element, to turn on the light emitting element functioning normally by supplying current to the first circuit while closing either the first switch or the second switch, whichever corresponds to the light emitting element in which the abnormality is detected, and opening the other switch.

[6] The light source device according to [5], wherein the second circuit further includes a first diode provided with the first bypass route and a second diode provided with the second bypass route.

[7] The light source device according to [1], further comprising:
a first driver connected to the first circuit, the first driver configured to drive the first light emitting element and the second light emitting element through the first circuit to turn on the first light emitting element and the second light emitting element; and
a second driver connected to the second circuit, the second driver configured to drive either the first light emitting element or the second light emitting element, whichever functions normally, through the second circuit to turn on the light emitting element functioning normally, wherein
the controller is configured to control the first driver to drive the first light emitting element and
the second light emitting element if both the first light emitting element and the second light emitting element function normally, and if an abnormality occurs in either the first light emitting element or the second light emitting element, to control the second driver to drive the first light emitting element and the second light emitting element.

[8] The light source device according to [7], wherein the second circuit connects the first light emitting element and the second light emitting element in parallel.

[9] The light source device according to [7], wherein the second circuit includes a first switch connected to the first light emitting element in series and a second switch connected to the second light emitting element in series, and
the controller is configured to, if an abnormality occurs in either the first light emitting element or the second light emitting element, open either the first switch or the second switch, whichever corresponds to the light emitting element in which the abnormality occurs and close the other switch corresponding to the light emitting element functioning normally, and to control the second driver to drive the light emitting element functioning normally.

[10] The light source device according to [9], wherein the second circuit further includes a first resistor connected to the first light emitting element in series and a second resistor connected to the second light emitting element in series.

[11] A display device comprising:
a plurality of light emitting elements including at least a first light emitting element and a second light emitting element;
a lightguide plate including a first surface on which light from the first light emitting element and
the second light emitting element is incident and a second surface through which the light incident on the first surface exits;
a first circuit configured to connect the first light emitting element and the second light emitting element in series;
a second circuit configured to bypass each of the first light emitting element and the second light emitting element, the second circuit which is different from the first circuit;
a controller configured to turn on the first light emitting element and the second light emitting element using the first circuit if the first light emitting element and the second light emitting element function normally, and if either the first light emitting element or the second light emitting element functions abnormally, to turn on the light emitting element functioning normally using the second circuit; and
a display panel having a display area which is opposed to the second surface of the lightguide plate, the display panel configured to selectively pass the light from the second surface to display an image on the display area.

[12] The display device according to [11], comprising a first light emitting element group and a second light emitting element group each including the first light emitting element and the second light emitting element, wherein
the first circuit and the second circuit are provided with the first light emitting element group and the second light emitting element group, respectively, and
light from the first light emitting element and the second light emitting element of the first light emitting element group is incident on the first surface of the lightguide plate and exits from a first area of the second surface of the lightguide plate, and light from the first light emitting element and the second light emitting element of the second light emitting group is incident on the first surface of the lightguide plate and exits from a second area of the second surface of the lightguide plate, and
the controller is configured to individually control the brightness of the first light emitting element and the second light emitting element of the first light emitting element group and the brightness of the first light emitting element and the second light emitting element of the second light emitting element group on the basis of data of an image to be displayed on the display area.

[13] The display device according to [12], wherein the first light emitting element group and the second light emitting element group each have one end which is connected to a first electrode and the other end which is connected to a second electrode,
the display device further comprises a detector configured to detect an abnormality in the first light emitting element group and the second light emitting element group on the basis of a voltage waveform from the second electrode side of the first circuit of the first light emitting element group and the second light emitting element group, and
the controller is configured to turn on the first light emitting element and the second light emitting element of the light emitting element group from which an abnormality is not detected by the detector between the first light emitting element group and the second light emitting element group using the first circuit and configured to turn on either the first light emitting element or the second light emitting element, whichever functions normally, of the light emitting element group from which an abnormality is detected by the detector between the first light emitting element group and the second light emitting element group using the second circuit.

[14] The display device according to [11], wherein the second circuit includes
a first bypass route connected to the first circuit bypassing the first light emitting element,
a second bypass route connected to the first circuit bypassing the second light emitting element,
a first switch provided with the first bypass route, and
a second switch provided with the second bypass route, wherein
the controller is configured to turn on the first light emitting element and the second light emitting element by supplying current to the first circuit while opening the first switch and the second switch if the first light emitting element and the second light emitting element function normally, and if an abnormality occurs in either the first light emitting element or the second light emitting element, to turn on the light emitting element functioning normally by supplying current to the first circuit while closing either the first switch or the second switch, whichever corresponds to the light emitting element in which the abnormality is detected, and opening the other switch.

[15] The display device according to [14], wherein the second circuit further includes a first diode provided with the first bypass route and a second diode provided with the second bypass route.

[16] The display device according to [11], further comprising:
a first driver connected to the first circuit, the first driver configured to drive the first light emitting element and the second light emitting element through the first circuit to turn on the first light emitting element and the second light emitting element; and
a second driver connected to the second circuit, the second driver configured to drive either the first light emitting element or the second light emitting element, whichever functions normally, through the second circuit to turn on the light emitting element functioning normally, wherein
the controller is configured to control the first driver to drive the first light emitting element and the second light emitting element if both the first light emitting element and the second light emitting element function normally, and if an abnormality occurs in either the first light emitting element or the second light emitting element, to control the second driver to drive the first light emitting element and the second light emitting element.

[17] The display device according to [16], wherein the second circuit connects the first light emitting element and the second light emitting element in parallel.

[18] The display device according to [16], wherein the second circuit includes a first switch connected to the first light emitting element in series and a second switch connected to the second light emitting element in series, and
the controller is configured to, if an abnormality occurs in either the first light emitting element or the second light emitting element, open either the first switch or the second switch, whichever corresponds to the light emitting element in which the abnormality occurs and close the other switch corresponding to the light emitting element functioning normally, and to control the second driver to drive the light emitting element functioning normally.

[19] The display device according to [18], wherein the second circuit further includes a first resistor connected to the first light emitting element in series and a second resistor connected to the second light emitting element in series.

Note that the first light emitting element and the second light emitting element correspond to any optional two of the light emitting elements LE connected in series, and the first light emitting element group and the second light emitting element group correspond to any optional two of the strings S. In addition to the above examples, various devices and method can be achieved from the disclosure of the present application.

What is claimed is:

1. A light source device comprising:
a plurality of light emitting elements including at least a first light emitting element and a second light emitting element;
a lightguide plate including a first surface on which light from the first light emitting element and the second light emitting element is incident and a second surface through which the light incident on the first surface exits;
a first circuit configured to connect the first light emitting element and the second light emitting element in series;
a second circuit configured to bypass each of the first light emitting element and the second light emitting element, the second circuit which is different from the first circuit; and
a controller configured to turn on the first light emitting element and the second light emitting element using the first circuit if the first light emitting element and the second light emitting element function normally, and if either the first light emitting element or the second light emitting element functions abnormally, to turn on the light emitting element functioning normally using the second circuit.

2. The light source device according to claim 1, comprising a first light emitting element group and a second light emitting element group each including the first light emitting element and the second light emitting element, wherein
the first circuit and the second circuit are provided with the first light emitting element group and the second light emitting element group, respectively, and
light from the first light emitting element and the second light emitting element of the first light emitting element group is incident on the first surface of the lightguide plate and exits from a first area of the second surface of the lightguide plate, and light from the first light emitting element and the second light emitting element of the second light emitting group is incident on the first surface of the lightguide plate and exits from a second area of the second surface of the lightguide plate, and
the controller is configured to individually turn on and turn off the first light emitting element and the second light emitting element of the first light emitting element group and the first light emitting element and the second light emitting element of the second light emitting element group.

3. The light source device according to claim 2, wherein the first light emitting element group and the second light emitting element group each have one end which is connected to a first electrode and the other end which is connected to a second electrode,
the light source device further comprises a detector configured to detect an abnormality in the first light emitting element group and the second light emitting element group on the basis of a voltage waveform from the second electrode side of the first circuit of the first light emitting element group and the second light emitting element group, and
the controller is configured to turn on the first light emitting element and the second light emitting element of the light emitting element group from which an abnormality is not detected by the detector between the first light emitting element group and the second light emitting element group using the first circuit and configured to turn on either the first light emitting element or the second light emitting element, whichever functions normally, of the light emitting element group from which an abnormality is detected by the detector between the first light emitting element group and the second light emitting element group using the second circuit.

4. The light source device according to claim 3, wherein the controller is configured to, if the detector detects an abnormality in either the first light emitting element group or the second light emitting element group, increase the brightness of the other group functioning normally to be greater than that of a normal operation.

5. The light source device according to claim 1, wherein the second circuit includes
a first bypass route connected to the first circuit bypassing the first light emitting element,
a second bypass route connected to the first circuit bypassing the second light emitting element, a first switch provided with the first bypass route, and
a second switch provided with the second bypass route, wherein
the controller is configured to turn on the first light emitting element and the second light emitting element by supplying current to the first circuit while opening the first switch and the second switch if the first light emitting element and the second light emitting element function normally, and if an abnormality occurs in either the first light emitting element or the second light emitting element, to turn on the light emitting element functioning normally by supplying current to the first circuit while closing either the first switch or the second switch, whichever corresponds to the light emitting element in which the abnormality is detected, and opening the other switch.

6. The light source device according to claim 5, wherein the second circuit further includes a first diode provided with the first bypass route and a second diode provided with the second bypass route.

7. The light source device according to claim 1, further comprising:
a first driver connected to the first circuit, the first driver configured to drive the first light emitting element and the second light emitting element through the first circuit to turn on the first light emitting element and the second light emitting element; and
a second driver connected to the second circuit, the second driver configured to drive either the first light emitting element or the second light emitting element, whichever functions normally, through the second circuit to turn on the light emitting element functioning normally, wherein
the controller is configured to control the first driver to drive the first light emitting element and the second light emitting element if both the first light emitting element and the second light emitting element function normally, and if an abnormality occurs in either the first light emitting element or the second light emitting element, to control the second driver to drive the first light emitting element and the second light emitting element.

8. The light source device according to claim 7, wherein the second circuit connects the first light emitting element and the second light emitting element in parallel.

9. The light source device according to claim 7, wherein the second circuit includes a first switch connected to the first light emitting element in series and a second switch connected to the second light emitting element in series, and
the controller is configured to, if an abnormality occurs in either the first light emitting element or the second light emitting element, open either the first switch or the second switch, whichever corresponds to the light emitting element in which the abnormality occurs and close the other switch corresponding to the light emitting element functioning normally, and to control the second driver to drive the light emitting element functioning normally.

10. The light source device according to claim 9, wherein the second circuit further includes a first resistor connected to the first light emitting element in series and a second resistor connected to the second light emitting element in series.

11. A display device comprising:
a plurality of light emitting elements including at least a first light emitting element and a second light emitting element;
a lightguide plate including a first surface on which light from the first light emitting element and the second light emitting element is incident and a second surface through which the light incident on the first surface exits;
a first circuit configured to connect the first light emitting element and the second light emitting element in series;
a second circuit configured to bypass each of the first light emitting element and the second light emitting element, the second circuit which is different from the first circuit;
a controller configured to turn on the first light emitting element and the second light emitting element using the first circuit if the first light emitting element and the second light emitting element function normally, and if either the first light emitting element or the second light emitting element functions abnormally, to turn on the light emitting element functioning normally using the second circuit; and
a display panel having a display area which is opposed to the second surface of the lightguide plate, the display panel configured to selectively pass the light from the second surface to display an image on the display area.

12. The display device according to claim 11, comprising a first light emitting element group and a second light emitting element group each including the first light emitting element and the second light emitting element, wherein
the first circuit and the second circuit are provided with the first light emitting element group and the second light emitting element group, respectively, and
light from the first light emitting element and the second light emitting element of the first light emitting element group is incident on the first surface of the lightguide plate and exits from a first area of the second surface of the lightguide plate, and light from the first light emitting element and the second light emitting element of the second light emitting group is incident on the first surface of the lightguide plate and exits from a second area of the second surface of the lightguide plate, and
the controller is configured to individually control the brightness of the first light emitting element and the second light emitting element of the first light emitting element group and the brightness of the first light emitting element and the second light emitting element of the second light emitting element group on the basis of data of an image to be displayed on the display area.

13. The display device according to claim 12, wherein the first light emitting element group and the second light emitting element group each have one end which is connected to a first electrode and the other end which is connected to a second electrode,
the display device further comprises a detector configured to detect an abnormality in the first light emitting element group and the second light emitting element group on the basis of a voltage waveform from the second electrode side of the first circuit of the first light emitting element group and the second light emitting element group, and
the controller is configured to turn on the first light emitting element and the second light emitting element of the light emitting element group from which an abnormality is not detected by the detector between the first light emitting element group and the second light emitting element group using the first circuit and configured to turn on either the first light emitting element or the second light emitting element, whichever functions normally, of the light emitting element group from which an abnormality of detected by the detector between the first light emitting element group and the second light emitting element group using the second circuit.

14. The display device according to claim 11, wherein the second circuit includes
    a first bypass route connected to the first circuit bypassing the first light emitting element,
    a second bypass route connected to the first circuit bypassing the second light emitting element,
    a first switch provided with the first bypass route, and
    a second switch provided with the second bypass route, wherein
    the controller is configured to turn on the first light emitting element and the second light emitting element by supplying current to the first circuit while opening the first switch and the second switch if the first light emitting element and the second light emitting element function normally, and if an abnormality occurs in either the first light emitting element or the second light emitting element, to turn on the light emitting element functioning normally by supplying current to the first circuit while closing either the first switch or the second switch, whichever corresponds to the light emitting element in which the abnormality is detected, and opening the other switch.

15. The display device according to claim 14, wherein the second circuit further includes a first diode provided with the first bypass route and a second diode provided with the second bypass route.

16. The display device according to claim 11, further comprising:
    a first driver connected to the first circuit, the first driver configured to drive the first light emitting element and the second light emitting element through the first circuit to turn on the first light emitting element and the second light emitting element; and
    a second driver connected to the second circuit, the second driver configured to drive either the first light emitting element or the second light emitting element, whichever functions normally, through the second circuit to turn on the light emitting element functioning normally, wherein
    the controller is configured to control the first driver to drive the first light emitting element and the second light emitting element if both the first light emitting element and the second light emitting element function normally, and if an abnormality occurs in either the first light emitting element or the second light emitting element, to control the second driver to drive the first light emitting element and the second light emitting element.

17. The display device according to claim 16, wherein the second circuit connects the first light emitting element and the second light emitting element in parallel.

18. The display device according to claim 16, wherein the second circuit includes a first switch connected to the first light emitting element in series and a second switch connected to the second light emitting element in series, and
    the controller is configured to, if an abnormality occurs in either the first light emitting element or the second light emitting element, open either the first switch or the second switch, whichever corresponds to the light emitting element in which the abnormality occurs and close the other switch corresponding to the light emitting element functioning normally, and to control the second driver to drive the light emitting element functioning normally.

19. The display device according to claim 18, wherein the second circuit further includes a first resistor connected to the first light emitting element in series and a second resistor connected to the second light emitting element in series.

* * * * *